(12) United States Patent
Pani et al.

(10) Patent No.: US 9,092,223 B1
(45) Date of Patent: Jul. 28, 2015

(54) SYSTEMS AND METHODS TO SAVE POWER IN DATA-CENTER NETWORKS

(75) Inventors: Ayaskant Pani, Fremont, CA (US); Shashidhar Rao Gandham, Fremont, CA (US)

(73) Assignee: Google Inc., Mountain View, CA (US)

( * ) Notice: Subject to any disclaimer, the term of this patent is extended or adjusted under 35 U.S.C. 154(b) by 204 days.

(21) Appl. No.: 13/485,432

(22) Filed: May 31, 2012

(51) Int. Cl.
*G06F 1/32* (2006.01)

(52) U.S. Cl.
CPC ............ *G06F 1/3287* (2013.01); *G06F 1/3209* (2013.01); *G06F 1/3234* (2013.01)

(58) Field of Classification Search
CPC .................. G06F 1/32–1/3209; G06F 1/3234; G06F 1/3253; G06F 1/3278; G06F 1/3287; G06F 1/3293–1/3296
USPC .................. 370/229, 235, 238, 241, 254–255, 370/351–356; 709/220–229, 238–239, 709/241–242, 244; 713/300–340
See application file for complete search history.

(56) References Cited

U.S. PATENT DOCUMENTS

| 2003/0084357 | A1 | 5/2003 | Bresniker et al. |
|---|---|---|---|
| 2007/0300083 | A1 | 12/2007 | Goodrum et al. |
| 2009/0077407 | A1 | 3/2009 | Akimoto |
| 2009/0125737 | A1 | 5/2009 | Brey et al. |
| 2009/0183016 | A1 | 7/2009 | Chan et al. |
| 2011/0055611 | A1 | 3/2011 | Sharma et al. |
| 2011/0078467 | A1* | 3/2011 | Hildebrand .................. 713/310 |
| 2013/0294723 | A1* | 11/2013 | Kewitsch ........................ 385/17 |

OTHER PUBLICATIONS

Heller, B., et al. "Dynamic Power Saving in Fat-Tree Interconnection Networks Using on/Off Links." Parallel and Distributed Processing Symposium, 2006.*
Alonso, M., et al. "Dynamic Power Saving in Fat-Tree Interconnection Networks Using On/Off Links." Parallel and Distributed Processing Symposium, 2006.
Heller, B., et al. "ElasticTree: Saving Energy in Data Center Networks." http://static.usenix.org/events/nsdi10/tech/full_papers/heller.pdf, last updated Mar. 3, 2010.

* cited by examiner

*Primary Examiner* — Michael Thier
*Assistant Examiner* — Eric Myers
(74) *Attorney, Agent, or Firm* — Edward A. Gordon; Foley & Lardner LLP

(57) ABSTRACT

A network may assign or reassign data paths to allow the network to shut down servers or switches and meet network demand at a lower energy cost. By assigning or reassigning data paths, network demand is met using only a subset of the network elements, allowing a subset of servers and switches to be temporarily shut down, thereby saving power while maintaining the ability to meet network demand.

30 Claims, 11 Drawing Sheets

SYSTEMS AND METHODS TO SAVE POWER IN DATA-CENTER NETWORKS

TECHNICAL FIELD

The systems and methods described herein relate to power savings, and particularly, to saving power in data-center networks.

BACKGROUND

A network may be defined by the pattern of connections between elements of the network, commonly referred to as the network topology. Data centers often use a multi-stage Clos or folded-Clos network topology, in which a network element may be linked to multiple higher-level network elements: servers are connected to top-of-rack (ToR) switches, each ToR switch is connected to multiple switches of the next layer, which in turn are connected to multiple next-tier switches, and so on. Such a topology provides both high bandwidth and a high tolerance for path failures, and is therefore excellently suited to periods of high network demand.

But such a topology may be over-provisioned. Actual network demand is often much lower than peak demand, but the servers and switches in the network will draw largely as much power when they have no demand to respond to as they will when working at full capacity. A data center must be able to meet the highest level of demand for its services, but it should minimize the overall power consumption while providing resiliency.

SUMMARY

A system to reduce the power consumption of the network when the network does not face peak demand would therefore be of great benefit in data-center operations, particularly a system that can adjust the logical topology of the network.

Accordingly, the systems and methods described herein relate to adjusting network topology and traffic routing to reduce power consumption. By identifying and shutting down superfluous servers and switches during periods of low demand and restarting those servers and switches during periods of high demand, a network may meet network traffic demand while consuming less energy.

In one embodiment, the method monitors the utilization level and the power consumption of servers, hosts, and switches (collectively, network elements) to determine a set of minimum network elements to carry traffic in the network. The method reconfigures a configurable patch panel to implement a logical topology connecting the set, and reroutes network traffic over the logical topology according to network traffic demand and to power consumption. Network traffic is thus rerouted such that low-power-cost network elements carry traffic rather than high-power-cost network elements. A network element bearing reduced traffic is placed in a low-power state, which may include slowing or deactivating an idle port of the network element, deactivating a component associated with the idle port, or deactivating the network element entirely. If the set of minimum network elements includes a network element placed in a low-power state, the network element may be activated, changing the power state of the network element and allowing the network element to bear more traffic. Thus, a high-power-cost network element may be made available to meet demand during a period of high traffic, but is placed into a low-power state to reduce power consumption by the network during a period of low traffic. The method thereby reduces energy consumption by the network while continuing to meet demand for network traffic.

According to another aspect, the system described herein relates to reducing power consumption in a network having a configurable patch panel and a software-configured packet switch. In certain embodiments, the system comprises a patch panel manager, a network element manager, a remote-access power switch, a power manager, and a solver. The network element manager monitors a status of a network element, which may include the amount of traffic associated with the network element or the power consumption by the network element. The solver identifies a minimum set of network elements to carry network traffic based on the status monitored by the network element manager and a network performance target, which may include reducing power consumption subject to maintaining a minimum traffic speed. The solver further identifies a logical topology connecting the minimum set and a traffic routing plan over the logical topology. The patch panel manager implements the logical topology through the configurable patch panel, and the network element manager implements the traffic routing plan through the software-configured packet switch. In response to a change in the amount of traffic to be carried by a network element, the power manager changes a power state of the network element through the remote-access power switch. Changing the power state of a network element may include activating, deactivating, or reducing the speed of a plurality of ports of the network element, a component associated with the plurality of ports, or the network element. A component associated with a plurality of ports may include a line card, an application-specific integrated circuit (ASIC), a network processor, or other network component.

BRIEF DESCRIPTION OF THE DRAWINGS

The systems and methods described herein are set forth in the appended claims. However, for the purpose of explanation, several embodiments are set forth in the following figures.

DETAILED DESCRIPTION OF CERTAIN ILLUSTRATIVE EMBODIMENTS

In the following description, numerous details are set forth for the purpose of explanation. However, one of ordinary skill in the art will realize that the embodiments described herein may be practiced without the use of these specific details, that the embodiments described herein may be modified, supplemented, or otherwise altered, and the features and details described with these systems and methods are not essential and may be varied or modified as appropriate to address the application at hand.

The systems and methods described herein relate, in certain embodiments, to reducing power consumption by a network with a central controller. In certain particular embodiments, the central controller identifies a logical topology and a traffic routing plan that will meet traffic demand, turns on network elements in the identified logical topology, implements the logical topology and the traffic routing plan, and shuts down superfluous servers or switches to reduce energy consumption. The network thus uses less energy during periods of low traffic demand while maintaining spare capacity to meet periods of high traffic demand.

Figure 1:
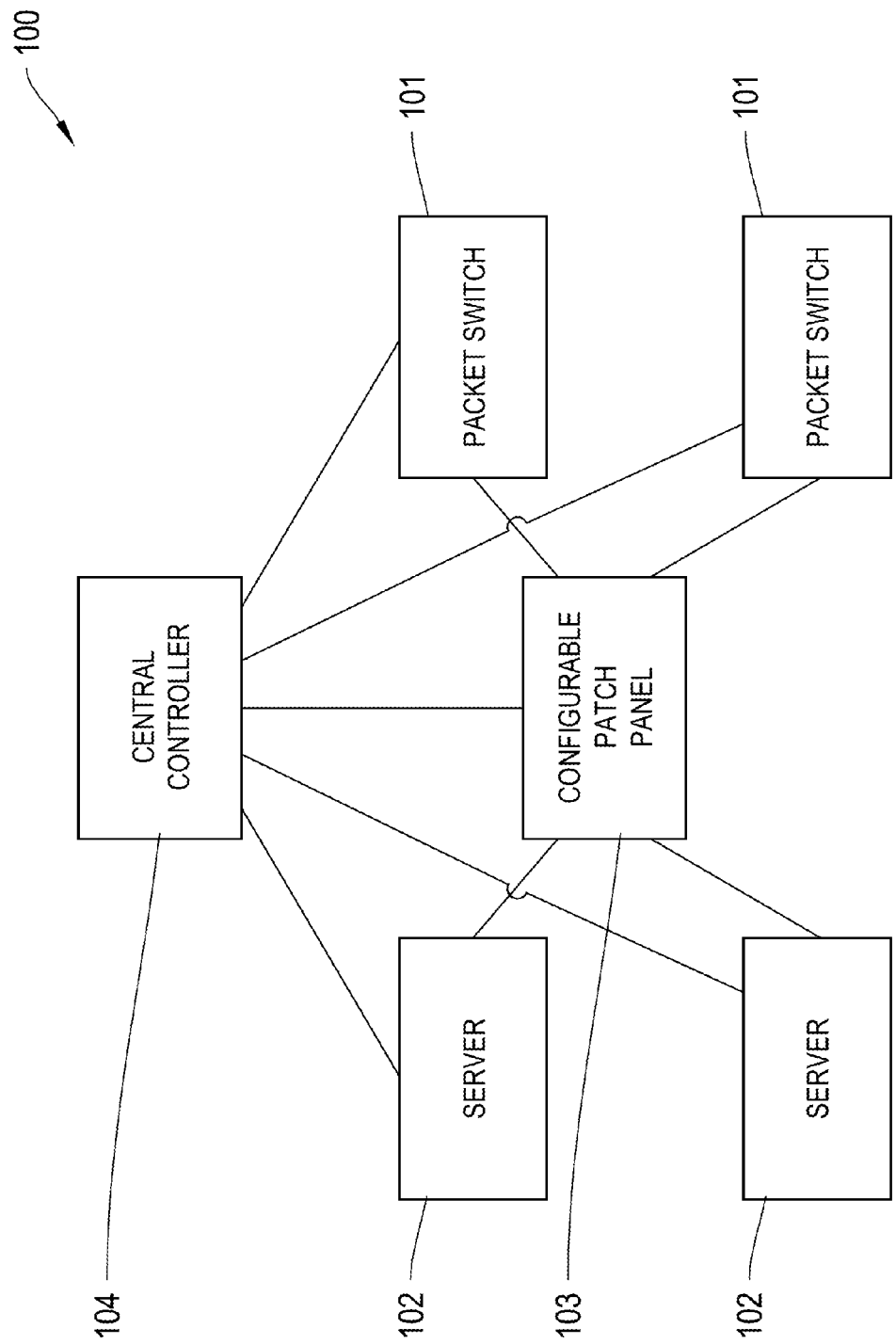
FIG. 1 is a block diagram of an energy-saving network.

FIG. 1 is an illustrative block diagram of an energy saving network 100. In network 100, a software-configured packet switch 101, described in detail in relation to FIG. 3, transmits network traffic associated with a server or end-host 102. Software-configured packet switches 101 and servers 102 are collectively referred to as network elements. A network element has a network element utilization, a ratio of the amount of network traffic the network element handles to the amount of network traffic the network element is capable of handling. Network elements are connected through a configurable patch panel 103, described in detail in relation to FIG. 2A and FIG. 2B. Configurable patch panel 103 can change the logical topology of network 100 by changing how and whether associated network elements are connected to each other. Central controller 104, described in detail in relation to FIG. 5, monitors the status of and traffic in network 100, controls how configurable patch panel 103 connects associated network elements, and controls how a software-configured packet switch 101 routes traffic. Thus, during periods of low traffic, central controller 104 can allocate network traffic to a fraction of available network elements. A network element bearing less than a predetermined amount of network traffic may be placed in a low-power state to conserve energy without harming network performance. Network 100 may include a different number of software-configured packet switches 101, servers 102, or configurable patch panels 103 than are shown. In certain embodiments, network 100 may be connected to other networks, the elements of which are distinguished from network 100 by not being under the control of central controller 104. In certain embodiments, servers 102 may not be directly connected to central controller 104.

The centralized overview and control provided by the depicted central controller 104 may reduce power consumption by network 100. In response to a predetermined network event, such as a network administrator request, a change in network traffic, or other suitable network event, central controller 104 may implement an alternative logical topology and a revised traffic routing plan to meet a network performance target while reducing power consumption by network 100. A network performance target may include maintaining a minimum traffic speed, a maximum time for traffic to flow between two servers 102 on the network, or other suitable target for performance by a computer network. As an illustrative example, if two software-configured packet switches of network 100 were operating at one-third capacity, central controller 106 may disconnect network elements associated with a first switch and connect the network elements to the second switch, allowing network 100 to shut the first switch down without dropping traffic.

Figure 2A:
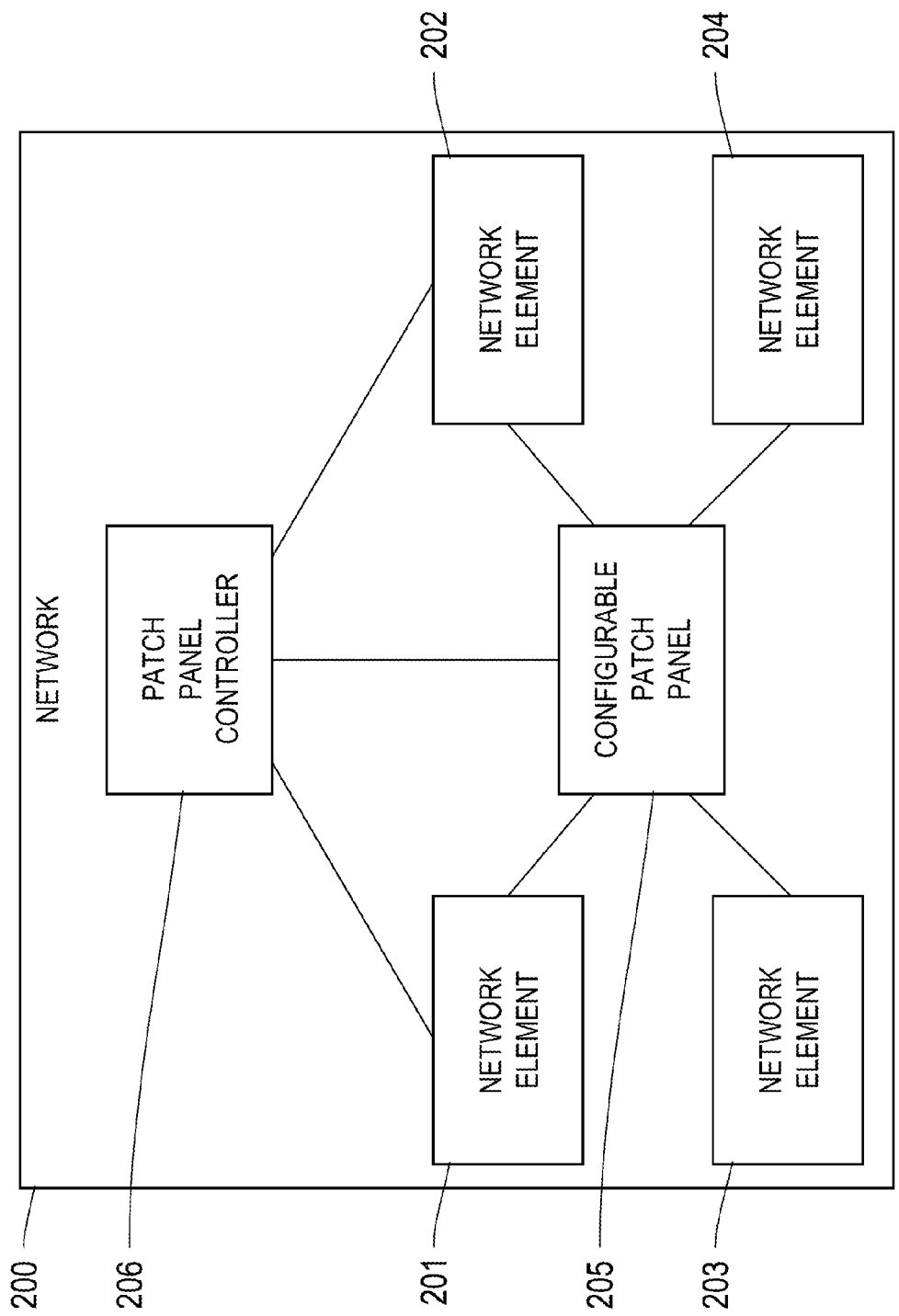
FIG. 2A is a block diagram of the physical topology of a network using a configurable patch panel.
Figure 2B:
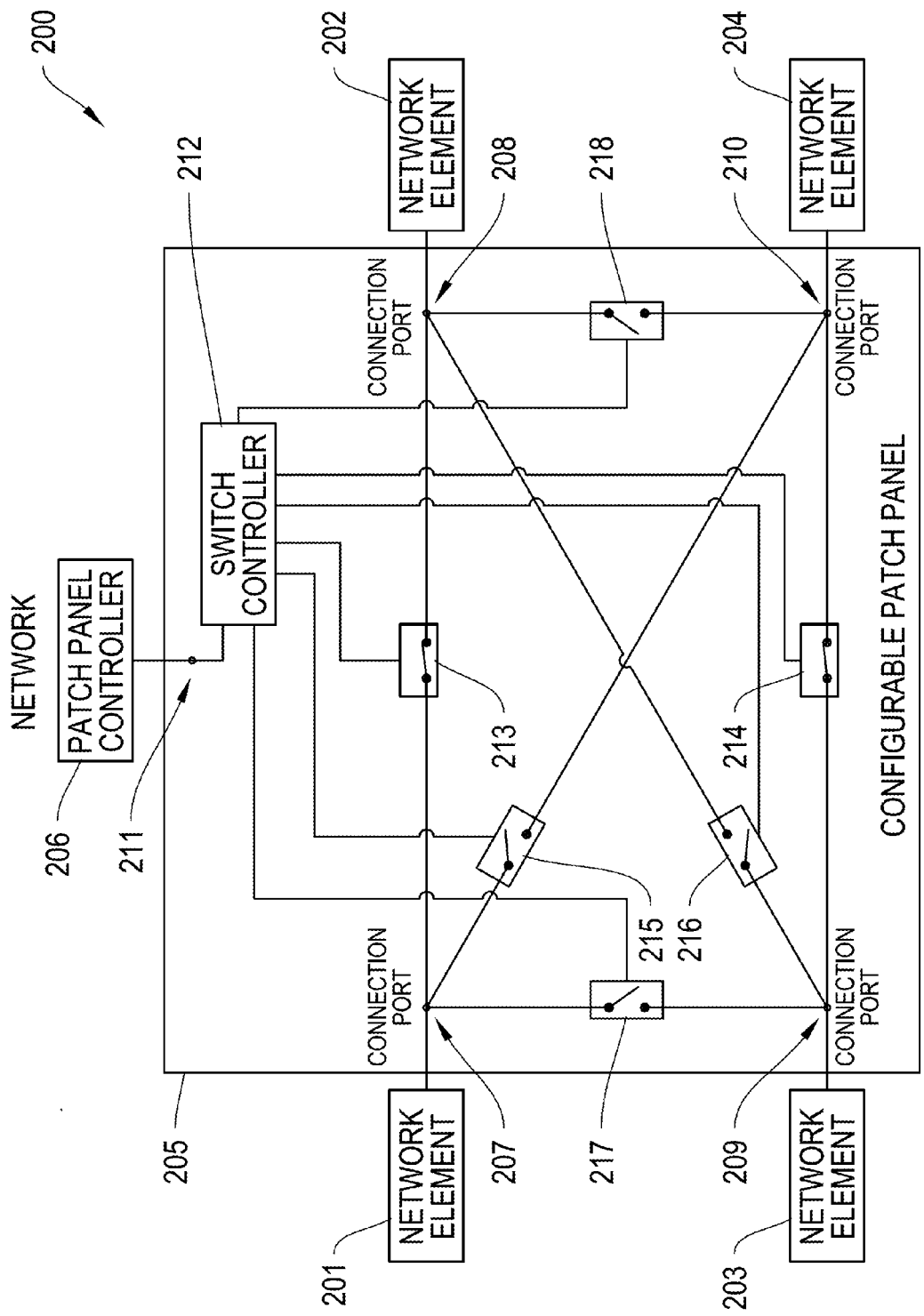
FIG. 2B is a block diagram of a possible logical topology of a network using a configurable patch panel.

FIGS. 2A and 2B are illustrative diagrams of a network 200 with a configurable patch panel. FIG. 2A depicts the physical topology of network 200: network elements 201-204 are physically linked to a configurable patch panel 205, which is controlled by a patch panel controller 206. FIG. 2B depicts a logical topology of network 200 created by configurable patch panel 205. Network elements 201 and 202 are connected to each other via connection ports 207 and 208 of configurable patch panel 205, and network elements 203 and 204 are connected to each other via connection ports 209 and 210 of configurable patch panel 205. Although no cable directly connects a first network element to a second network element, configurable patch panel 205 creates virtual links that allow network elements to communicate with each other. Configurable patch panel 205 thereby allows network traffic to be moved from a high-power-cost network element to a low-power-cost network element without taking time to reassign tasks among servers or end-hosts.

Configurable patch panel 205 connects or disconnects connection ports 207-210 according to instructions received from patch panel patch panel controller 206 via instruction port 211. Such instructions are implemented by switch controller 212, which breaks or makes connections between connection ports 207-210 by opening or closing switches 213-218. In certain embodiments, configurable patch panel 205 is an optical circuit switch. In certain embodiments, one network element may be connected to more than one connection port 207-210, for example by connecting connection ports 207 and 208 to two different ports on a single software-configured packet switch.

The depicted connection ports 207-210 are network ports, and may include 100BASE-TX Ethernet ports, 1000BASE-T Ethernet ports, 10GBASE-T Ethernet ports, or other suitable network ports. Each of the connection ports 207-210 transmits data received from a network element to a second port connected by configurable patch panel 205, and transmits data received from the second port to a network element. As an illustrative example, if configurable patch panel 205 connects connection port 207 to connection port 208, data received from network element 201 will be transmitted to network element 202 via connection port 208. In certain embodiments, ports 207-210 may translate electrical signals to optical signals and vice-versa as necessary. In certain embodiments, there may be a different number of connection ports than are depicted.

The depicted instruction port 211 is a network port similar to connection port 207. Configurable patch panel 205 receives connection instructions from and transmits connection information to patch panel controller 206 through instruction port 211. In certain embodiments, instruction port 211 may be a logical port dedicated to receiving instructions from patch panel controller 206, such as a socket end point of a transmission control protocol (TCP), secure sockets layer (SSL), transport layer security (TLS), or other connection protocol suitable for transmitting control communications. In certain embodiments, there may be more than one instruction port 211.

The depicted switch controller 212 is a computer controller which, in response to instructions received through instruction port 211, opens or closes switches 213-218 of configurable patch panel 205, disconnecting or connecting ports respectively.

Switches 213-218 are computer-controlled switches which determine the connections between connection ports 207-210. As depicted, switch 213 is closed, and therefore connection port 207 is connected to connection port 208; similarly, as switch 214 is closed, connection port 209 is connected to connection port 210. Likewise, connection ports 207 and 210 could be connected by closing switch 215; connection ports 208 and 209 could be connected by closing switch 216; connection ports 207 and 209 could be connected by closing switch 217; and connection ports 208 and 210 could be connected by closing switch 218. In certain embodiments, switches 213-218 may be software switches, transistors, Pockels cells, or other suitable switches.

Configurable patch panel 205 controls the logical topology of network 200. Network elements 201-204 are physically connected to configurable patch panel 205 as depicted in FIG. 2A, but the logical connection between two network elements is determined by the configuration of configurable patch panel 205. As an illustrative example, opening switch 213 and closing switch 215 breaks a logical connection between network elements 201 and 202 and creates a logical connection between network element 201 and 204. Referring to FIG. 1, configurable patch panel 205 may therefore disconnect an active server 102 from a high-power-cost switch 101 and connect the active server 102 to a low-power-cost switch 101, saving power without spending time unplugging cables or migrating tasks from the active server 102 to a second server 102 already connected to the low-power-cost switch 101. As depicted in FIG. 2B, switches 213 and 214 are closed while switches 215-218 are open, in which case a data packet transmitted by network element 201 will be received by network element 202. If, however, patch panel controller 206 instructs switch controller 212 to close switch 213 and open switch 215, a data packet sent by network element 201 will instead reach network element 204. Likewise, if patch panel controller 206 instructs switch controller to open switch 217 and close all other switches, a data packet sent by network element 201 will be received by network element 203. Configurable patch panel 205 therefore allows network 200 to adopt several different logical topologies without changing the physical topology depicted in FIG. 2A.

Figure 3:
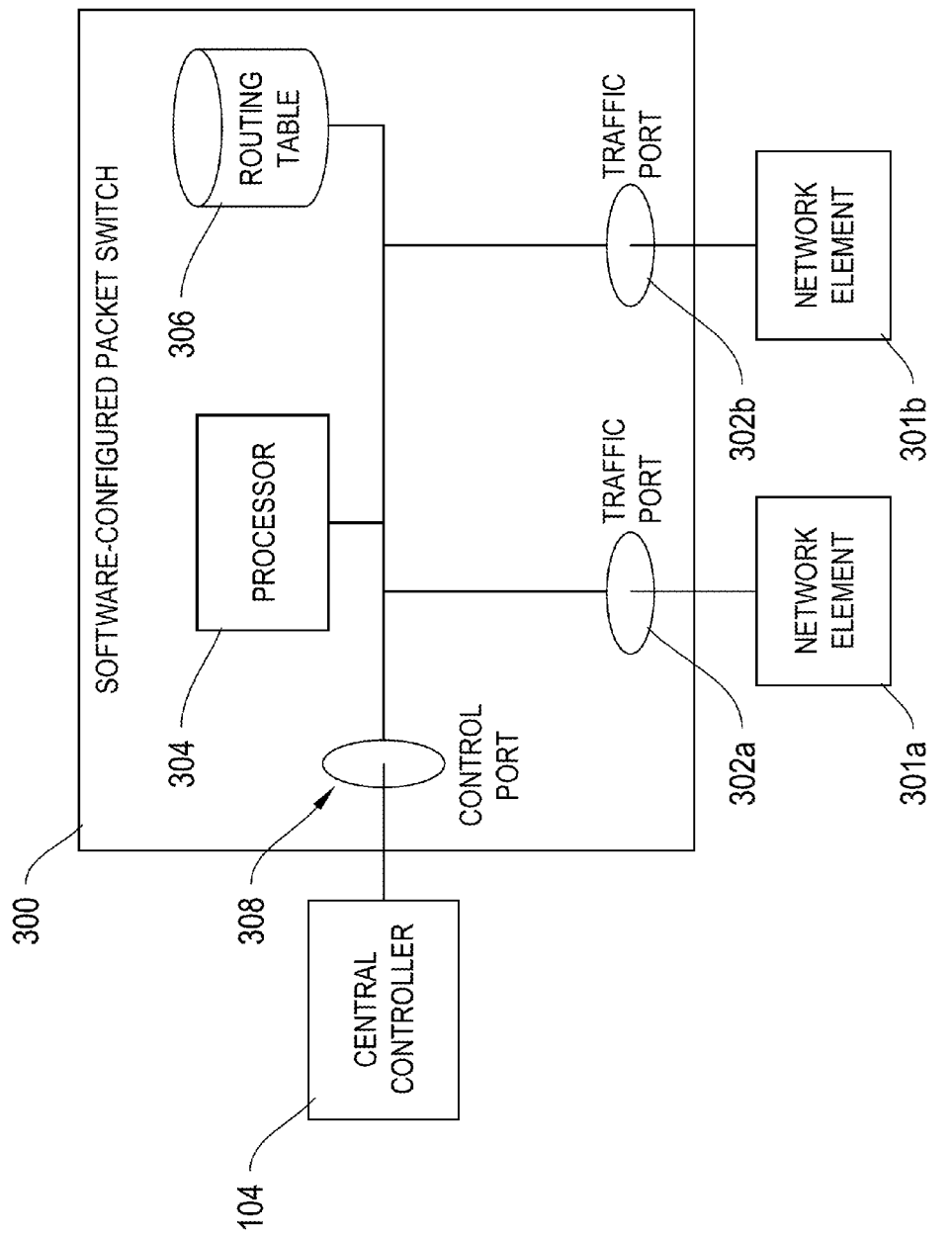
FIG. 3 is a block diagram of a software-configurable packet switch.

FIG. 3 is an illustrative block diagram of one software-configured packet switch 300, which transmits network traffic between connected network elements. Referring to FIG. 1, software-configured packet switch 300 differs from a standard packet switch in being controlled by central controller 104. As central controller 104 can therefore implement a low-power-cost traffic routing plan through software-configured packet switch 300, software-configured packet switch 300 allows central controller 104 to reduce power consumption in a network. Software-configured packet switch 300 operates by sending and receiving network traffic from network elements 301a and 301b through traffic ports 302a and 302b respectively. Processor 304 determines the destination of incoming network traffic and forwards the traffic according to the rules stored in routing table 306. As an illustrative example, if network element 301a sends data to network element 301b, software-configured packet switch 300 will receive data at traffic port 302a, identify the destination of the data at processor 304, and transmit the data to network element 301b via traffic port 302b in accordance with instructions in routing table 306. Referring to FIG. 1, control port 308 allows software-configured packet switch 300 to communicate status information to central controller 104, and allows central controller 104 to update routing table 306. Status information may include the amount and destination of traffic flowing through ports 302a and 302b, capacity utilization, power consumption, or other information regarding the operations of software-configured packet switch 300, and may be used by central controller 104 to identify a low-power-cost traffic routing plan. In certain embodiments, software-configured packet switch 300 may operate under the OpenFlow protocol.

The depicted traffic ports 302a and 302b are network ports which receive network traffic from linked network elements and transmit network traffic sent by processor 304. Traffic ports 302a and 302b may include 100BASE-TX ports, 1000BASE-T ports, 10GBASE-T ports, or other suitable network ports. In certain embodiments, there may be a different number of ports than are depicted.

The depicted processor 304 is a computer processor capable of receiving, analyzing, and transmitting data through network ports. Processor 304 fulfills the function of a packet switch by receiving network traffic through traffic ports 302a and 302b, identifying where and how to transmit the network traffic, and transmitting the network traffic accordingly. Processor 304 also provides data used to identify a low-power-cost topology and traffic routing plan by gathering network traffic information associated with software-configured packet switch 300 and transmitting the gathered information to central controller 104. Processor 304 may also implement a low-power-cost traffic routing plan identified by central controller 104 by revising routing table 306 in response to receiving modification instructions from central controller 104. In certain embodiments, processor 304 may also gather power consumption information associated with software-configured packet switch 300 and transmit the gathered information to central controller 104. In certain embodiments, processor 304 may program a hardware module, such as an ASIC or network processor, to perform the job of forwarding packets.

The depicted routing table 306 is a computer memory suitable for storing routing rules in software-configured packet switch 300, including random access memory (RAM), a hard drive, flash memory, or other suitable computer memory. A routing rule indicates where and how to transmit incoming network traffic based on the destination of the traffic, the source of the traffic, or some other suitable information. The routing rules in routing table 306 reflect a traffic routing plan for a plurality of network elements. In certain embodiments, the routing rules can be translated to OpenFlow rules with match criteria and action.

The depicted control port 308 is a network port connecting software-configured packet switch 300 with central controller 104, and may include a 100BASE-TX port, a 1000BASE-T port, a 10GBASE-T port, or other suitable network port. In certain embodiments, control port 308 may be a logical port dedicated to communications with central controller 104, such as a socket end point of a transmission control protocol (TCP), secure sockets layer (SSL), transport layer security (TLS), or other connection protocol suitable for transmitting control communications. Software-configured packet switch 300 transmits status information, such as network traffic information, port status, or other relevant status information, to central controller 104 via control port 308. Central controller 104, in turn, transmits routing instructions to software-configured packet switch 300 through control port 308. In certain embodiments, there may be more than one control port 308.

Software-configured packet switch 300 transmits network traffic between network elements linked to software-configured packet switch 300 in the logical topology. Rules for routing network traffic are provided by central controller 104 via control port 308, and are stored in routing table 306. When network traffic with a predetermined characteristic is received over traffic port 302a or 302b, processor 304 identifies the predetermined characteristic and follows an associated rule for routing network traffic with the predetermined characteristic. Processor 304 also sends status information regarding software-configured packet switch 300 to central controller 104. Central controller 104 may modify routing rules in response to receiving status information.

Figure 4:
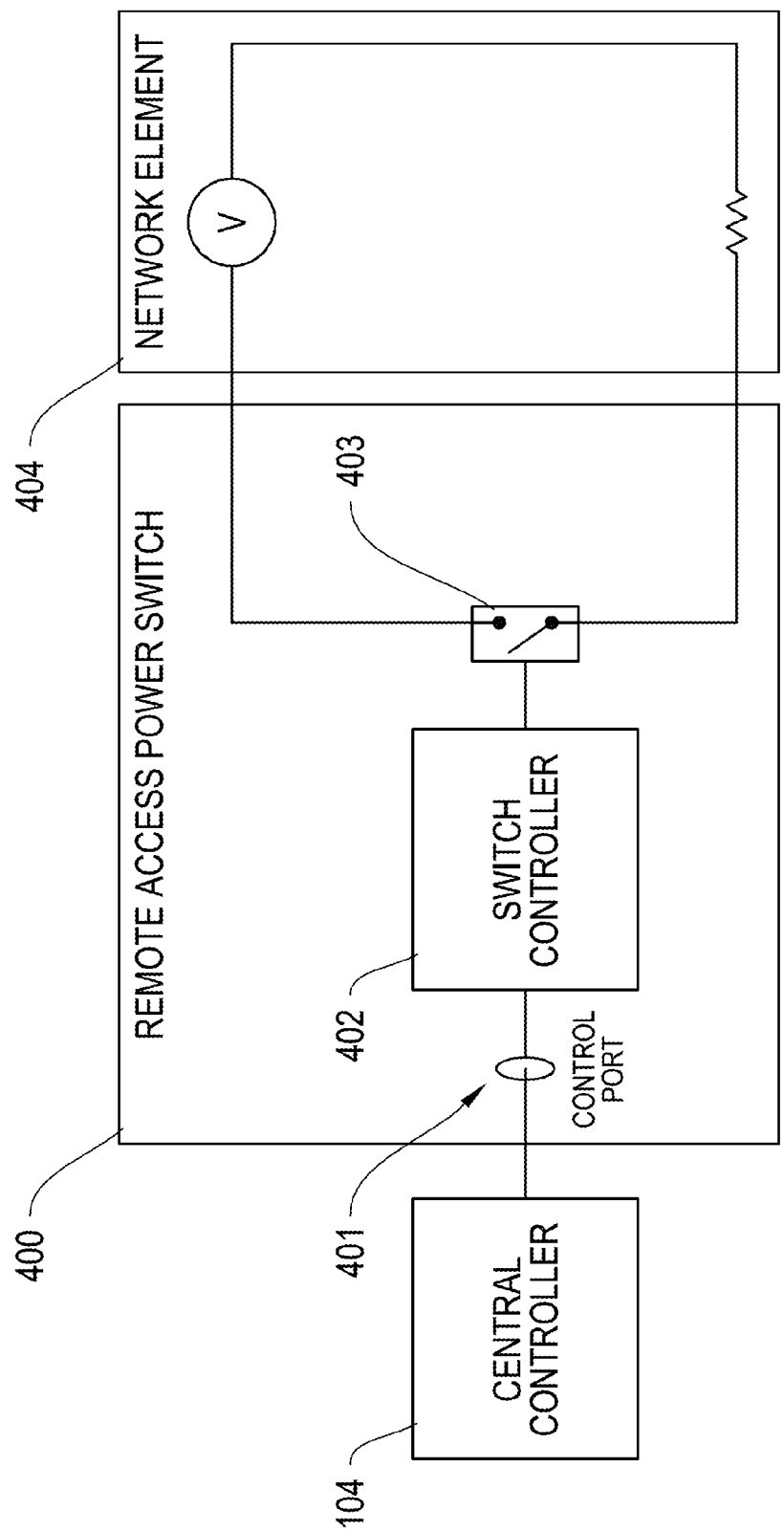
FIG. 4 is a block diagram of a remote-access power switch.

FIG. 4 is an illustrative block diagram of a remote-access power switch 400. Referring to FIG. 1, remote-access power switch 400 allows central controller 104 to change a power state of a network element 404. Network element 404 may be a server 102 or a software-configured packet switch 101. Remote-access power switch 400 receives instructions from central controller 104 through control port 401. Switch controller 402 implements the instructions received through control port 401 by changing the status of switch 403, which controls the supply of power to network element 404. In certain embodiments, remote-access power switch 400 is a Wake-On-LAN-enabled network card, such as is described in detail in U.S. Pat. No. 8,140,871, which is incorporated herein in entirety by reference.

Remote-access power switch 400 allows central controller 104 to save power while maintaining network performance. Remote-access power switch 400 saves power by reducing power consumption by network element 404 when network element 404 has excess capacity for handling network traffic. When central controller 104 routes less traffic through network element 404, central controller 104 may instruct remote-access power switch 400 to slow or deactivate a plurality of ports of network element 404, a component associated with the plurality of ports, or network element 404 as a whole. Conversely, if central controller 104 assigns more network traffic to network element 404, central controller 104 may instruct remote-access power switch 400 to activate or stop slowing network element 404, a plurality of ports of network element 404, or a component associated with the plurality of ports.

The depicted control port 401 is a network port through which remote-access power switch 400 receives power instructions from central controller 104. Control port 401 may include a 100BASE-TX port, a 1000BASE-T port, a 10GBASE-T port, or other suitable network port.

The depicted switch controller 402 is a computer processor which changes the state of switch 403 to implement instructions provided by central controller 104. In certain embodiments, switch controller 402 may prevent data corruption by implementing a safe shut-down procedure in network element 404 before turning off network element 404.

The depicted switch 403 is a switch controlling power consumption by network element 404. Switch 403 may activate, deactivate, or place network element 404 in a reduced-power mode. The reduced-power mode may reduce the speed of a component of network element 404, shut down an idle component of network element 404, or otherwise reduce energy consumption by network element 404 by shutting down excess capacity of network element 404. In certain embodiments, switch 403 does not physically control the power supply of the network element 404, but sends an appropriate command to network element 404, such as to shut down, start up, enter a power-saving mode, leave a power-saving mode, or to take some other suitable action.

Remote-access power switch 400 controls the power state of a network element 404. In response to receiving a command from central controller 104 through control port 401, switch controller 402 changes the state of switch 403, thereby changing the power state of network element 404. Remote-access power switch 400 thereby allows network element 404 to be remotely deactivated to save power during periods of low network traffic demand, and to be remotely activated to meet high network traffic demand.

Figure 5:
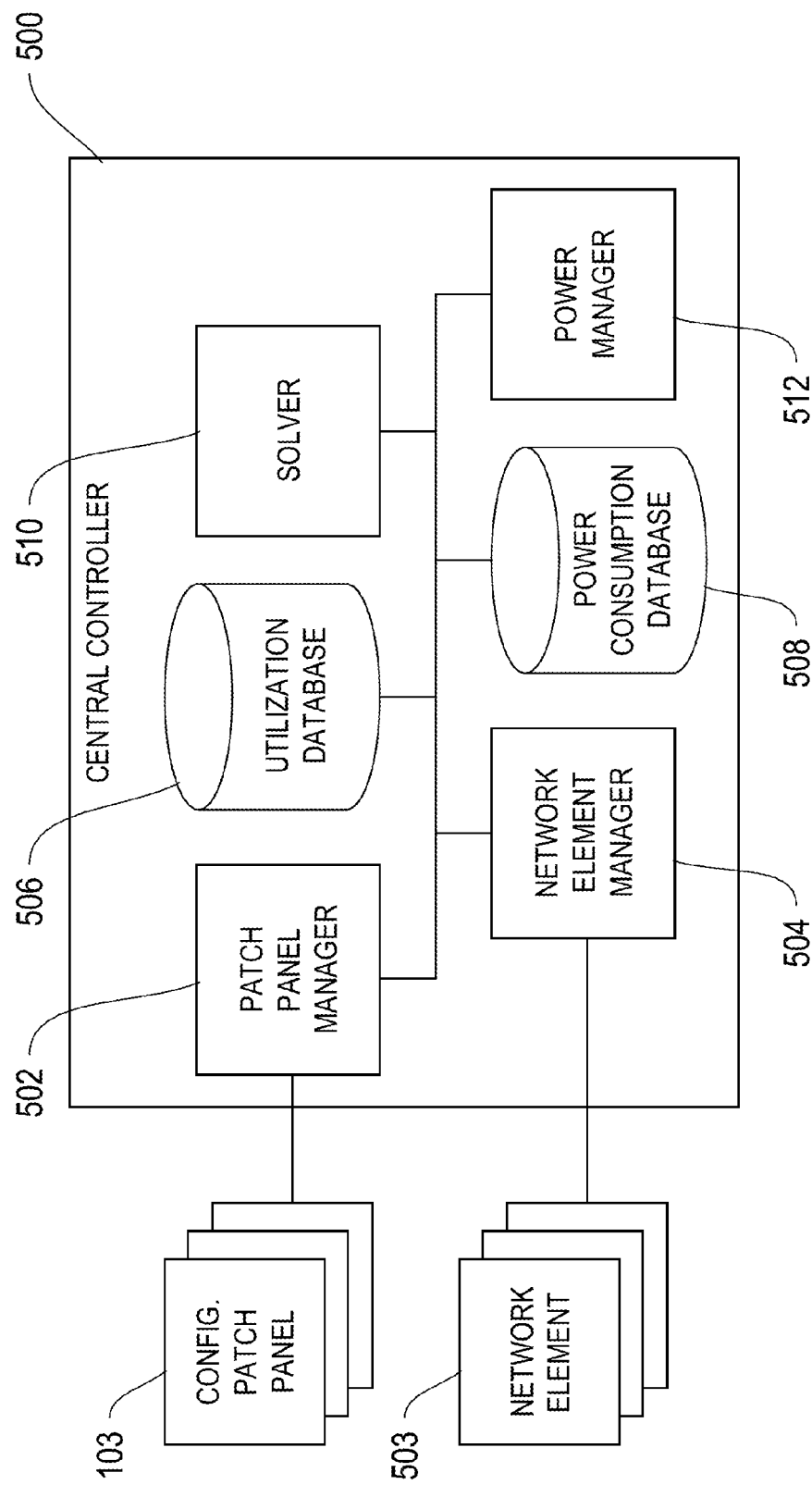
FIG. 5 is a block diagram of a central controller.

FIG. 5 is an illustrative diagram of a central controller 500, a computing device which reduces power consumption of a network by identifying and implementing a logical topology and a traffic routing plan for a network. Referring to FIG. 1, patch panel manager 502 implements the logical topology for the network by configuring a configurable patch panel 103. The logical topology reduces the number of network elements 503 that must be kept active to carry network traffic. Network element manager 504 monitors network traffic and implements a traffic routing plan in the network. Utilization database 506 records the network traffic capacity of each network element 503 of a plurality of network elements 503. Power consumption database 508 records power consumption associated with a plurality of network elements 503, allowing central controller 500 to route network traffic to a low-power-cost network element 503 from a high-power-cost network element 503. Solver 510 compares network traffic with capacity utilization and power consumption information to identify a low-power set of network elements 503 that can carry network traffic, a logical topology connecting the low-power set, and a traffic routing plan among the low-power set. Power manager 512 changes the power state of a network element based on the utilization of the network element in the traffic routing plan identified by solver 510. In certain embodiments, central controller 500 may be an OpenFlow Controller. In certain embodiments, the elements of central controller 500 may be distributed over more than one computing device.

The depicted patch panel manager 502 is a computer processor configured for directing internal connection changes in configurable patch panel 103. By directing configurable patch panel 103 to disconnect a first port from a second port and connect the first port to a third port, patch panel manager 502 implements a change in logical topology. During a period of low network demand, patch panel manager 502 may group idle network elements 503 within a logical topology, allowing the network elements 503 to be shut down without spending time migrating tasks from a server connected to a high-power-cost switch to a server connected to a low-power-cost switch. In certain embodiments, patch panel manager 502 may use the TL1 protocol, the OpenFlow protocol, or some other appropriate protocol.

The depicted network element manager 504 is a computer processor programmed to monitor a status of a plurality of network elements and implement a traffic routing plan in the plurality of software-configured packet switches 101. The status of a network element may include the amount of network traffic and power consumption associated with the network element. In certain embodiments, network element manager 504 may use the OpenFlow protocol or some other appropriate protocol for monitoring the network and implementing a traffic routing plan for the network.

The depicted utilization database 506 is a computer memory storing capacity information for a plurality of network elements, and may include RAM, a hard drive, flash memory, or other suitable computer memory. The capacity information stored in utilization database 506 and the amount of network traffic measured by network element manager 504 determine both a utilization of a network element and a set of minimum network elements required to carry network traffic. Comparing the capacity of a plurality of network elements to the power consumed by the plurality of network elements also allows solver 510 to assign network traffic to low-power-cost network elements. In certain embodiments, utilization database 506 may store historic, expected, or other appropriate utilization or capacity information for a plurality of network elements.

The depicted power consumption database 508 is a computer memory storing power consumption information for a plurality of network elements. In certain embodiments, power consumption information includes both direct and indirect power consumption information. Direct power consumption is the power required to operate a network element, while indirect power consumption is the power required to keep the network element connected to network 100. The indirect power consumption of a network element depends on the power consumption of a next-tier switch, the switch through which the network element is connected to another network element. As an illustrative example, a next-tier switch for a server is a top-of-rack (ToR) switch, which can connect one server to another. Similarly, in a multistage network, one ToR switch is connected to a second ToR switch through a switch in the next tier of the network. The indirect power consumption of a network element is the sum of the power consumed by a plurality of next-tier switches connected to the network element divided by the number of active links on the plurality of next-tier switches. As an illustrative example, if four ToR switches are connected to a next-tier switch, each ToR switch directly consumes the power required to operate a ToR switch, and indirectly consumes one-fourth of the power required to operate the next-tier switch.

Figure 6:
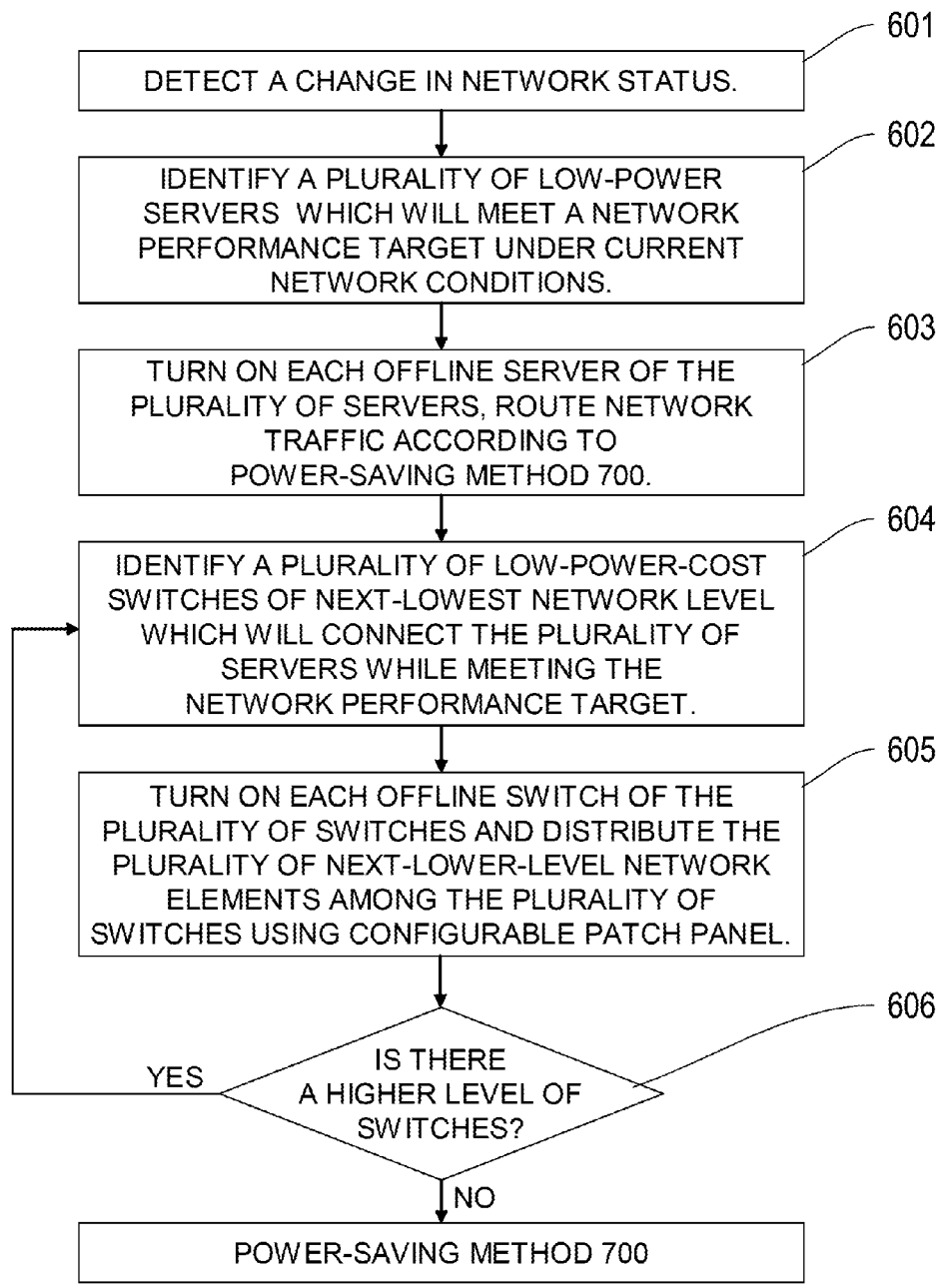
FIG. 6 is a flow chart of a method of changing a logical topology to reduce energy consumption by a network.
Figure 7:
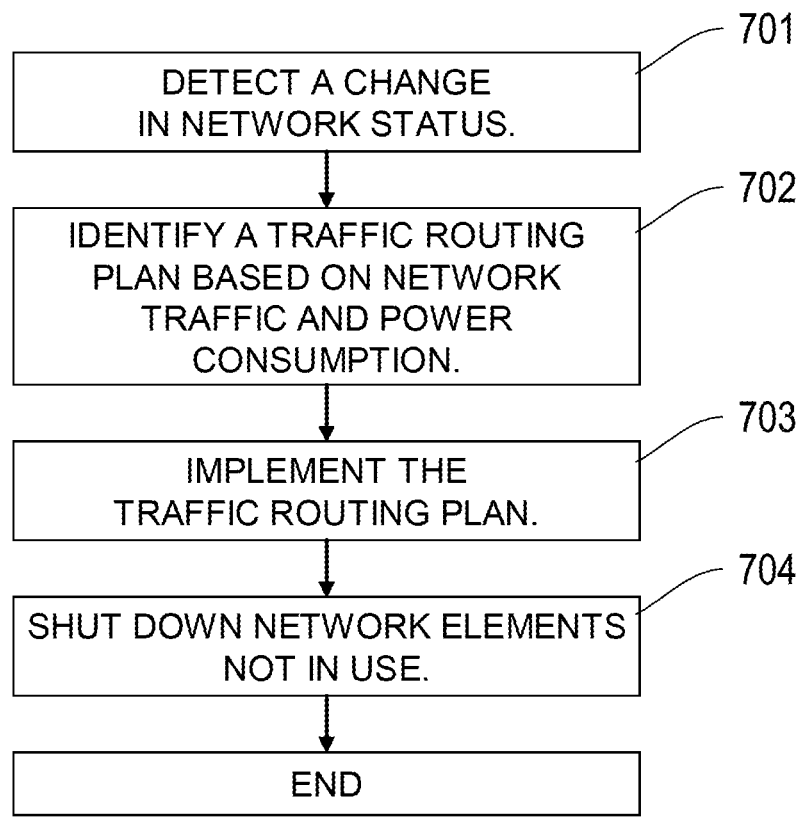
FIG. 7 is a flow chart of a method of changing a traffic routing plan to reduce energy consumption by a network.

The depicted solver 510 is a computer processor which identifies a traffic routing plan and an alternative logical topology for the network that will meet network traffic demand at the lowest power cost, as described in detail in reference to FIG. 6 and FIG. 7. Solver 510 uses patch panel manager 502 to implement the alternative logical topology and network element manager 504 to implement the traffic routing plan. Network elements which do not bear network traffic in the traffic routing plan may be deactivated without affecting network traffic. In certain embodiments, solver 510 may identify and implement a traffic routing plan without changing the logical topology of the network.

The depicted power manager 512 is a computer processor programmed to turn a plurality of network elements on or off. Referring to FIG. 4, in response to solver 510 identifying a network element 404 as an element in an alternative logical topology, power manager 512 instructs a remote-access power switch 400 to activate the network element 404. Similarly, in response to solver 510 not assigning network traffic to a network element 404, power manager 512 instructs a remote-access power switch 400 to deactivate the network element 404. In certain embodiments, power manager 512 may reduce power consumption by a network element 404 by placing the network element in a low-power state, as described in detail in reference to FIG. 4.

Central controller 500 reduces power consumption in a network by adjusting the logical topology and traffic routing plan of the network. To identify when a logical topology or traffic routing plan change is necessary, network element manager 504 monitors a plurality of network elements for a network event, which may include a change in network traffic, a command from a system administrator, a failure to meet a network performance target such as a minimum network traffic rate, or other suitable network event. In response to a network event, solver 510 identifies a logical topology and a traffic routing plan for the network that minimizes power consumption subject to meeting a network performance target, as described in detail in reference to FIG. 5 and FIG. 6. Power manager 512 changes the power status of a network element as required by the logical topology and traffic routing plan, patch panel manager 502 implements the logical topology, and network element manager 504 implements the traffic routing plan.

FIG. 6 is an illustrative flow chart depicting a topology change method 600 for changing a logical topology of a computer network to reduce power consumption by the network. As changing the logical topology of a network takes time and therefore imposes a cost, topology change method 600 begins with step 601 detects a predetermined change in network status. Referring to FIG. 5, the predetermined change in network status is detected by network element manager 504, and may include a network element being connected or disconnected, a change in network traffic, a projected change in network traffic, an instruction from a network administrator, a lapse of a predetermined amount of time, or some other predetermined network status change.

In step 602, solver 510 responds to the change in network status by identifying a plurality of low-power servers which will meet a network performance target, which may include keeping capacity utilization within a predetermined range. Solver 510 identifies the plurality of low-power servers by comparing status information provided by network element manager 504, capacity information stored in utilization database 506, and power consumption information stored in power consumption database 508. In step 603, power manager 512 identifies each offline server in the plurality of servers identified in step 602 and turns the offline server on.

Topology change method 600 then adjusts the logical topology of the switches connecting the plurality of servers identified in step 602 on a level-by-level basis. Step 604 addresses the tier of network elements above the network elements addressed in the step preceding step 604. As an illustrative example, if step 604 follows a step addressing servers, step 604 will address ToR switches. Similarly, if step 604 follows a step addressing ToR switches, step 604 will address the tier of switches connecting ToR switches. In step 604, as in step 602, solver 510 identifies a plurality of low-power-cost switches which will connect the plurality of servers while meeting the network performance target. In step 605, as in step 603, power manager 512 identifies any offline switch in the plurality of switches identified in step 604 and turns them on, and network element manager 504 ensures that each lower-tier network element in the plurality of lower-tier network elements is connected to a switch in the plurality of switches identified in step 604. As an illustrative example, if step 604 identified a plurality of ToR switches, step 605 assigns each host in an identified plurality of hosts to a ToR switch in the plurality of ToR switches. Step 606 determines if the network includes a higher tier of switches than were identified in step 604, and, if so, returns to step 604. If not, the logical topology change is complete. Once the logical topology change is complete, power-saving method 700 routes network traffic and reduces power consumption accordingly.

FIG. 7 is an illustrative flow chart depicting a power-saving method 700 for changing a traffic routing plan of a computer network to reduce power consumption by the network. As changing the traffic routing plan of a network takes time and therefore imposes a cost, power-saving method 700 begins with step 701 detecting a predetermined change in network status. Referring to FIG. 5, the predetermined change in network status may be detected by network element manager 504, and may include a change in logical topology, a network element being connected or disconnected, a change in network traffic, a projected change in network traffic, an instruction from a network administrator, a lapse of a predetermined amount of time, or some other predetermined network status change.

In step 702, solver 510 identifies a traffic routing plan based on network traffic and power consumption. In certain embodiments, solver 510 may identify a traffic routing plan through a linear programming model to minimize the total power consumed by the network subject to constraints on network behavior.

The first network constraint of one such illustrative linear programming model declares that for each link in the network, the sum of all traffic forwarded over the link is less than or equal to the capacity of the link, and that the capacity of an offline link is zero. The first constraint may be expressed as an equation, such as:

$$\Sigma_{m \in H} \Sigma_{n \in H} y_{p(i),q(j)}^{m,n} < x_{p(i),q(j)} \times C_{p(i),q(j)} \text{ for all } (p(i),q(j)) \in E. \quad (1)$$

In particular, the left-hand side of Equation 1 represents the total traffic over a link: p and q are integers representing network elements, p(i) and q(j) are integers representing ports on network element p and q respectively, m and n are integers representing servers or end-hosts, H is the set of servers and end-hosts on the network, and y (p(i), q(j), m, n)) is the traffic over a link between port p(i) and q(j) associated with traffic traveling from m to n. Adding up the contribution of each pair of servers or end-hosts in the network to the traffic over a link produces the total traffic carried by the link. Similarly, the right-hand side of Equation 1 represents the capacity of the link. E is the set of links in the network, x (p(i), q(j)) is a binary variable equaling zero if there is no link between p(i) and q(j) and one if there is, and C (p(i), q(j)) is the capacity of the link between p(i) and q(j). As Equation 1 holds true for every link in the network, Equation 1 declares that no traffic can be carried by an offline link, and that an online link can carry no more traffic than the capacity of the online link. As an illustrative example, if there is a 100-gigabit link between a server and a ToR switch, up to 100 gigabits of data per second may be transferred between the server and the ToR switch if the link is online, and none can be transferred if the link is offline. Equation 1 is only an example equation, and other equations may be applied or used as the first constraint, or may be used with systems and methods that use a non-linear programming model, such as heuristic thresholds. In any case the actual equation or model used is not an essential element of the systems and methods described herein, and may vary depending on the application being addressed, the network elements, or upon other facts being addressed.

The second network constraint of the illustrative linear programming model is that the total traffic flow into or out of servers or end-hosts in the network equals the total network traffic. The second constraint may be expressed as an equation, such as:

$$\Sigma_{n \in H} \Sigma_{(m,q(j)) \in E} y_{m,q(j)}^{m,n} = \Sigma_{n \in H} D_{m,n} \text{ for all } m \in H. \quad (2)$$

In particular, q(j), m, n, H, and y are defined as they were in Equation 1, and D (m, n) is the traffic flowing from a server or end-host m to a server or end-host n. Thus, Equation 2 states that, for each server or end-host in the network, the total traffic over links between the server or end-host and other network elements equals the sum of all demand for traffic from the server or end-host. As an illustrative example, if there are three hosts on a network, and each host demands one gigabit of data per second from the other two hosts on the network, each host must transmit two gigabits of data per second to other network elements. Equation 2 is only an example equation, and other equations may be applied or used as the second constraint, or may be used with systems and methods that use a non-linear programming model, such as heuristic thresholds. In any case the actual equation or model used is not an essential element of the systems and methods described herein, and may vary depending on the application being addressed, the network elements, or upon other facts being addressed. As an illustrative example, the demand D (m, n) may be multiplied by a factor of 1.5 to accommodate a short spike in demand without requiring a wide-scale reprogramming of network behavior.

The third network constraint of the illustrative linear programming model is that data that flows through the network can be neither created nor destroyed by a switch. The third constraint may be expressed as an equation, such as:

$$\Sigma_{m \in H} \Sigma_{n \in H} \Sigma_{(p(i),q(j)) \in E} y_{p(i),q(j)}^{m,n} = \Sigma_{m \in H} \Sigma_{n \in H} \Sigma_{(r(k),p(i)) \in E} y_{r(k),p(i)}^{m,n} \text{ for all } p \in S. \quad (3)$$

In particular, the variables in Equation 3 are defined as they were in Equation 1, r(k) is an integer representing a port on network element r, and S is the set of switches in the network. Thus, Equation 3 states that, for each switch in the network, the sum of all traffic flowing into the switch must equal the sum of all traffic flowing out of the switch. As an illustrative example, if a network comprises one switch connecting three servers, each server transferring a combined 100 gigabits of data per second to the other two servers, the amount of data flowing into the switch and the amount of data flowing out of the switch must equal 300 gigabits of data per second. Equation 3 is only an example equation, and other equations may be applied or used as the third constraint, or may be used with systems and methods that use a non-linear programming model, such as heuristic thresholds. In any case the actual equation or model used is not an essential element of the systems and methods described herein, and may vary depending on the application being addressed, the network elements, or upon other facts being addressed.

The final network constraint of the illustrative linear programming model is that each port of a switch can be linked to no more than one other port. The fourth constraint may be expressed as an equation, such as:

$$\Sigma_{q \in S} \Sigma_{j \in N(q)} x_{p(i),q(j)} < 1 \text{ for all } p \in S \text{ and } i \in N(p). \quad (4)$$

In particular, the variables in Equation 4 are defined as they were in Equation 3, and N(p) is the set of ports on network element p. Thus, Equation 4 states that, for each port on each switch in the network, a port may be connected to no more than one other port. Moreover, as each port on each switch may be connected to no more than one other port, the number of links to a switch in the network cannot exceed the number of ports on the switch. Equation 4 is only an example equation, and other equations may be applied or used as the fourth constraint, or may be used with systems and methods that use a non-linear programming model, such as heuristic thresholds. In any case the actual equation or model used is not an essential element of the systems and methods described herein, and may vary depending on the application being addressed, the network elements, or upon other facts being addressed.

The goal of the illustrative linear programming model, minimizing the total power consumed by the network while carrying the network traffic, may be expressed as an equation, such as:

$$\min[\Sigma_{p(i),q(j)) \in E} x_{p(i),q(j)} \times p(i)_{cost} + \Sigma_{r \in R} \min(\Sigma_{q \in S} \Sigma_{j \in N(q)} \Sigma_{i \in N(r)} x_{r(i),q(j)}, 1) \times P_S]. \quad (5)$$

In particular, the variables in Equation 5 are defined as they were in Equation 4, $p(i)_{cost}$ is the power associated with running a port p(r(i) is an integer representing a port on network element r, R is the set of network elements in the network, and $P_S$ is the power associated with running switch s with every port deactivated. The first summation of Equation 5 thus represents the sum of power consumed by each active link in the network. The second summation is the sum of power consumed by each active switch s separate from the power consumed by the ports of s. Equation 5 therefore minimizes power consumption by active ports and switches. Equation 5 is only an example equation, and other equations may be applied or used as the linear programming model goal, or may be used with systems and methods that use a non-linear programming model, such as heuristic thresholds. For example, in certain embodiments the model goal may also account for power consumption by a host, or may account for placing a network element component associated with a plurality of network ports in a low-power state. In any case the actual equation or model used is not an essential element of the systems and methods described herein, and may vary depending on the application being addressed, the network elements, or upon other facts being addressed.

A traffic routing plan fulfilling the illustrative linear programming model meets all of the constraints expressed in Equations 1-4, and thus meets network demand. As the traffic routing plan also minimizes Equation 5, the traffic routing plan reduces the total power consumption by the network. Such a traffic routing plan may be found using a standard algorithm for solving a linear programming model, such as the simplex algorithm, described in Chapter 2 of Murty, Linear Programming, Wiley, which is incorporated herein in entirety by reference. By routing network traffic to each network element according to the solution of the linear programming model, solver 510 meets network traffic demand while reducing network power consumption. In certain embodiments, solver 510 may route traffic using a different method, which may include creating and solving a plurality of linear programming models, each model corresponding to a sections of a network; assigning a cost based on both power and capacity utilization to each link of a plurality of links in the network and routing network traffic according to Dijkstra's algorithm; or other suitable methods for generating a traffic routing plan. Dijkstra's algorithm determines a routing plan based on a cost of each route and is described in Section 24.3 of Thomas, Leiserson, Rivest, and Stein, Introduction to Algorithms, Third Edition, MIT Press and McGraw-Hill, which is incorporated herein in entirety by reference.

Having identified a traffic routing plan is identified in step 702, solver 510 uses network element manager 504 to implement the identified traffic routing plan in step 703. Power-saving method 700 then ends with step 704, in which power manager 512 reduces the power consumption by network elements left idle by step 703. Power manager 512 may deactivate a plurality of ports that are not linked to other ports in the traffic routing plan, a plurality of network element components that are only associated with inactive ports, and a plurality of network elements that have only inactive ports. Power manager 512 may also or alternatively reduce energy consumption by reducing the speed of a port or a network element component operating at less than full utilization under the traffic routing plan. Power-saving method 700 thus reduces network power consumption while continuing to meet network demand.

Figure 8A:
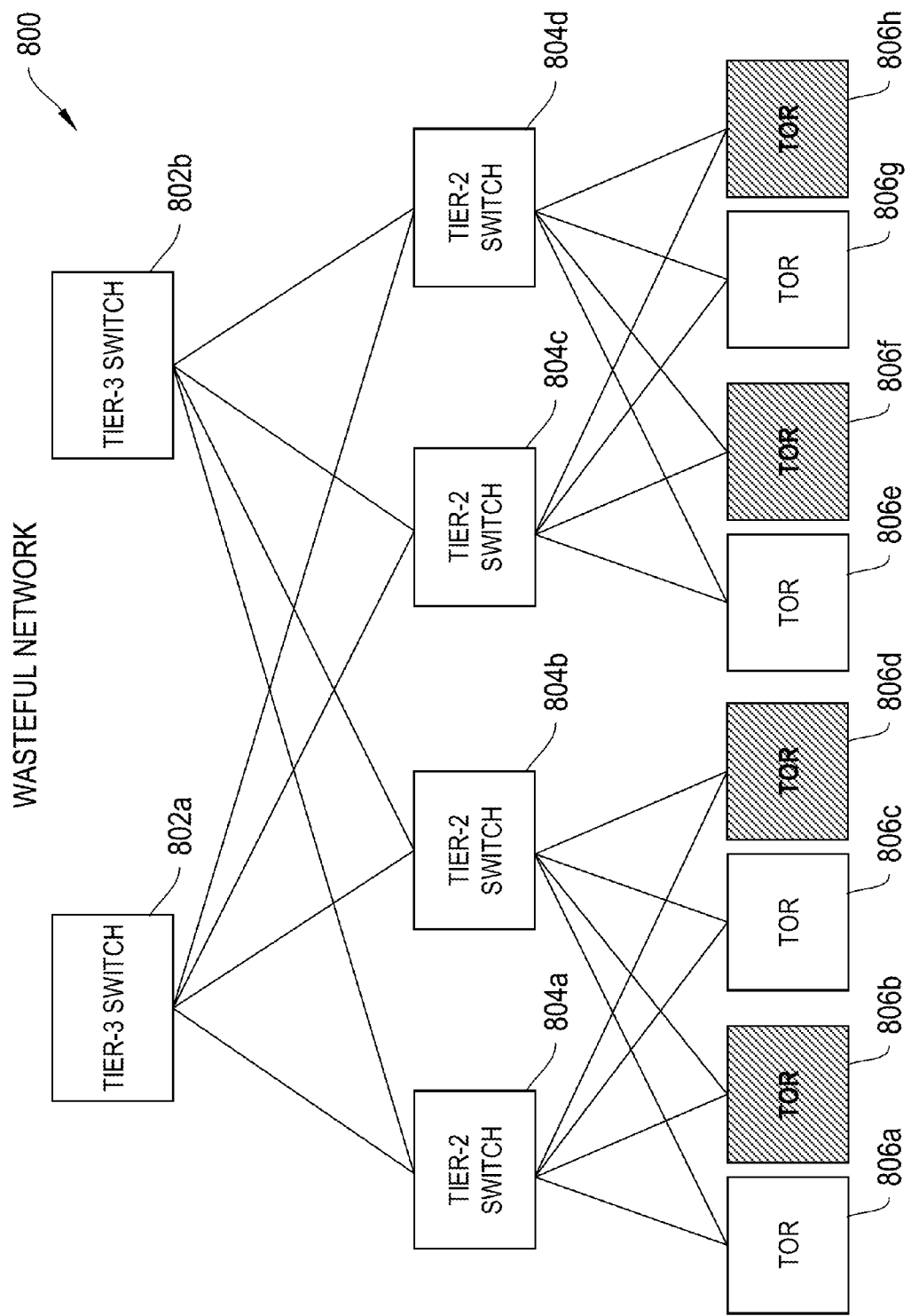
FIG. 8A is a block diagram illustrating a network during a period of low network traffic.
Figure 8B:
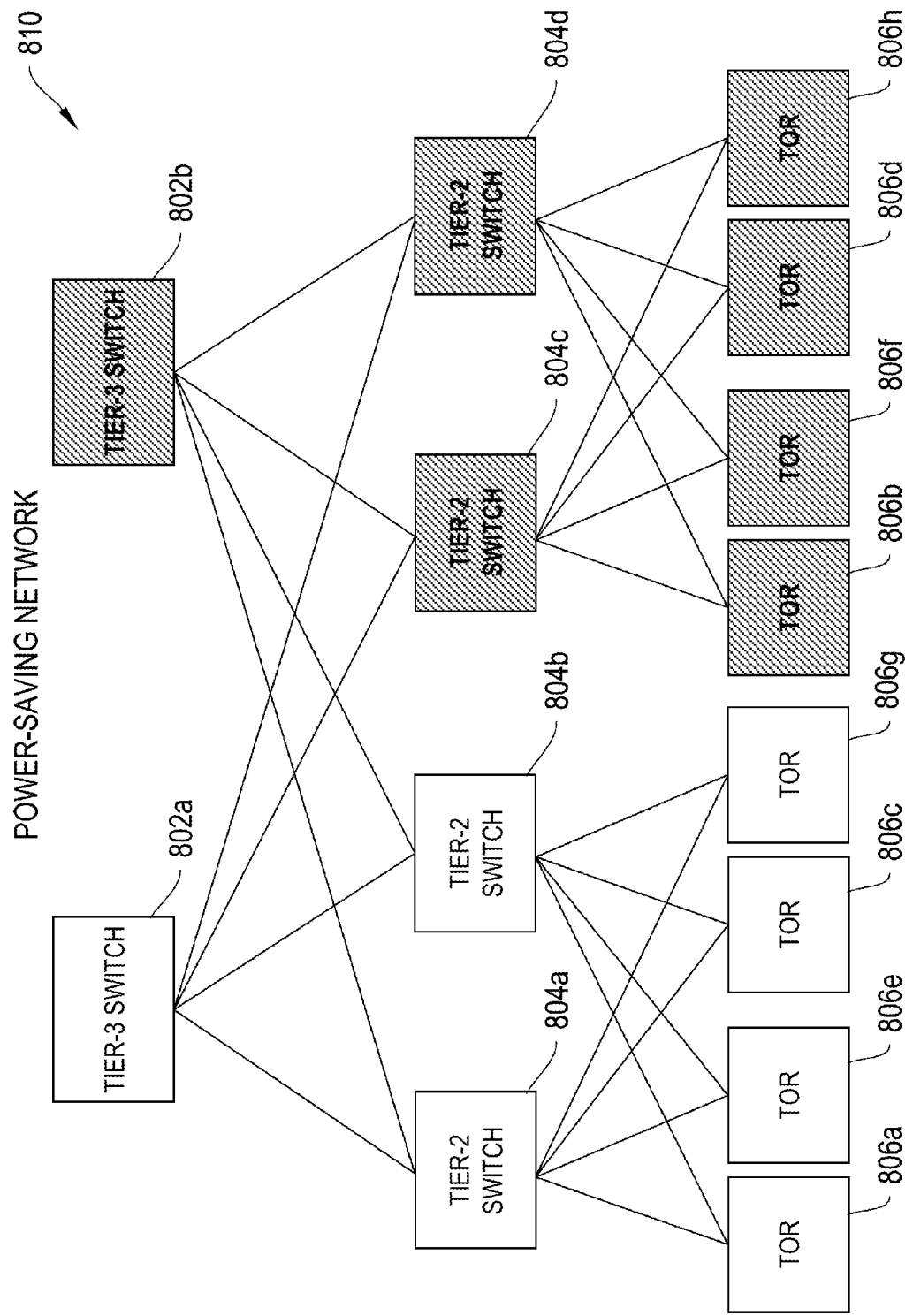
FIG. 8B is a block diagram illustrating an energy-saving network turning network elements off in response to low network traffic.

FIGS. 8A and 8B are block diagrams depicting an illustrative example of how the system described in relation to FIG. 1 reduces power consumption by a network. FIG. 8A is an illustrative block diagram of a wasteful network 800, illustrated without servers for clarity. Wasteful network 800 is a standard four-level network, with tier-3 switches 802*a-b*, tier-2 switches 804*a-d*, and ToR switches 806*a-h* (collectively, ToR switches 806). As indicated by the shading on ToR switches 806*b*, 806*d*, 806*f*, and 806*h*, servers connected to half of the ToR switches 806 of wasteful network 800 are idle. But although wasteful network 800 has twice as much capacity to handle network traffic as is being utilized, all network elements remain online, wasting power.

Figure 9:
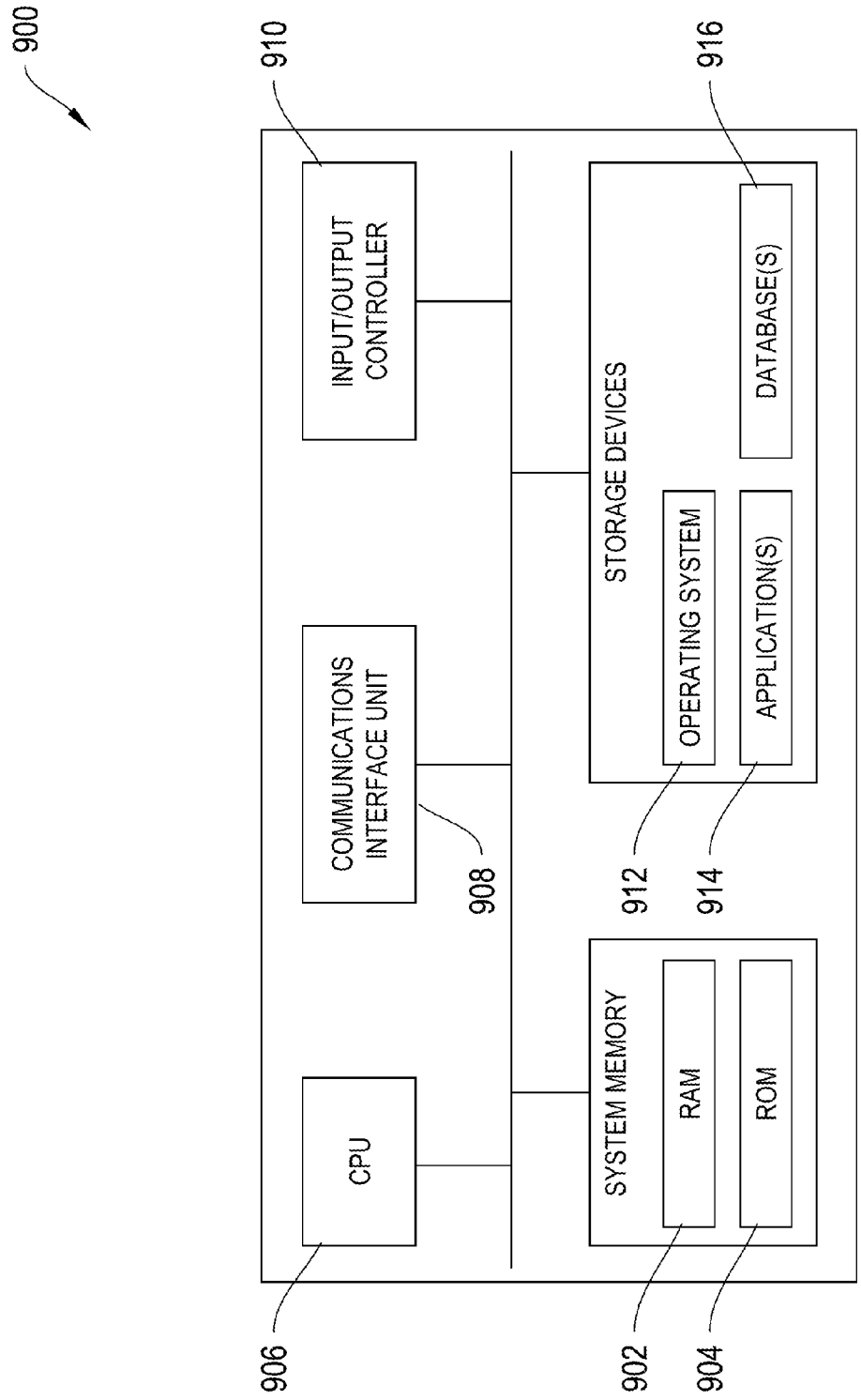
FIG. 9 is a block diagram of a computing device for performing any of the processes described herein.

FIG. 8B is an illustrative block diagram of an energy-saving network 810. Energy-saving network 810 is a network like network 100 depicted in FIG. 1, although servers 102, configurable patch panel 103, and central controller 104 have been left unillustrated for clarity. Energy-saving network 810 is identical to wasteful network 800 apart from the unillustrated configurable patch panel 103 and central controller 104. Although similar to wasteful network 800, energy-saving network 810 meets the same demand while consuming less power. Using configurable patch panel 103, energy-saving network 810 has swapped connections of two active ToR switches with connections of two idle ToR switches. As tier-2 switches 804*c* and 804*d* are thus connected only to idle ToR switches, energy-saving network 810 may turn off half of the aggregation switches. Moreover, as the number of active aggregation switches has been halved, tier-3 switch 802*b* may also be turned off. Energy-saving network 810 thereby handles the same network traffic as wasteful network 800 while reducing power consumption by network elements by one-half FIG. 9 is a block diagram of a computing device that can be used to implement or support the any of the components of the system of FIG. 1, and for performing any of the processes described herein. Each of the components of system 100 may be implemented on one or more computing devices 900. In certain aspects, a plurality of the components of system 100 may be included within one computing device 900. In certain implementations, a component and a storage device may be implemented across several computing devices 900.

The computing device 900 comprises at least one communications interface unit, an input/output controller 910, system memory, and one or more data storage devices. This can support a communications port such as traffic port 302*a* of FIG. 3. The system memory includes at least one random access memory (RAM 902) and at least one read-only memory (ROM 904). The memory 904 can support the utilization database 506 of FIG. 5, for example. All of these elements are in communication with a central processing unit (CPU 906) to facilitate the operation of the computing device 900. The computing device 900 may be configured in many different ways. For example, the computing device 900 may be a conventional standalone computer or alternatively, the functions of computing device 900 may be distributed across multiple computer systems and architectures. In FIG. 9, the computing device 900 is linked, via network or local network, to other servers or systems.

The computing device 900 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 908 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUE-TOOTH™, GSM and TCP/IP.

The CPU 906 comprises a processor, such as one or more conventional microprocessors and one or more supplementary co-processors such as math co-processors for offloading workload from the CPU 906. CPU 906 The CPU 906 is in communication with the communications interface unit 908 and the input/output controller 910, through which the CPU 906 communicates with other devices such as other servers, user terminals, or devices. The communications interface unit 908 and the input/output controller 910 may include multiple communication channels for simultaneous communication with, for example, other processors, servers or client terminals.

The CPU 906 is also in communication with the data storage device. The data storage device may comprise an appropriate combination of magnetic, optical or semiconductor memory, and may include, for example, RAM 902, ROM 904, flash drive, an optical disc such as a compact disc or a hard disk or drive. The CPU 906 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 906 may be connected to the data storage device via the communications interface unit 908. The CPU 906 may be configured to perform one or more particular processing functions.

The data storage device may store, for example, (i) an operating system 912 for the computing device 900; (ii) one or more applications 914 (e.g., computer program code or a computer program product) adapted to direct the CPU 906 in accordance with the systems and methods described here, and particularly in accordance with the processes described in detail with regard to the CPU 906; or (iii) database(s) 916 adapted to store information that may be utilized to store information required by the program. The depicted database 916 can be any suitable database system, including the commercially available Microsoft Access database, and can be a local or distributed database system. The design and development of suitable database systems are described in McGovern et al., A Guide To Sybase and SQL Server, Addison-Wesley (1993).

The operating system 912 and applications 914 may be stored, for example, in a compressed, an uncompiled and an encrypted format, and may include computer program code. The instructions of the program may be read into a main memory of the processor from a computer-readable medium other than the data storage device, such as from the ROM 904 or from the RAM 902. While execution of sequences of instructions in the program causes the CPU 906 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to reducing computer network power consumption as described herein. The program also may include program elements such as an operating system 912, a database management system and "device drivers" that allow the processor to interface with computer peripheral devices (e.g., a video display, a keyboard, a computer mouse, etc.) via the input/output controller 910.

The term "computer-readable medium" as used herein refers to any non-transitory medium that provides or participates in providing instructions to the processor of the computing device 900 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 906 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 900 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

As discussed above, a function relating to reducing computer network power consumption can be realized as a software component operating on a conventional data processing system such as a Unix workstation. In that embodiment, the function can be implemented as a C language computer program, or a computer program written in any high level language including C++, Fortran, Java or BASIC. See The C++ Programming Language, 2nd Ed., Stroustrup Addision-Wesley. Additionally, in an embodiment where microcontrollers or DSPs are employed, the function relating to reducing power consumption can be realized as a computer program written in microcode or written in a high level language and compiled down to microcode that can be executed on the platform employed. The development of such network traffic control systems is known to those of skill in the art, and such techniques are set forth in Digital Signal Processing Applications with the TMS320 Family, Volumes I, II, and III, Texas Instruments (1990). Additionally, general techniques for high level programming are known, and set forth in, for example, Stephen G. Kochan, Programming in C, Hayden Publishing. Developing code for the DSP and microcontroller systems follows from principles well known in the art.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. For example, a traffic routing plan may be identified using a modified Dijkstra's algorithm, a power cost may include power required to dissipate heat generated by a network resource, or the computer network may not be a data-center network. It should be understood that various alternatives to the embodiments of the disclosure described herein may be employed in practicing the disclosure. It is intended that the following claims define the scope of the disclosure and that methods and structures within the scope of these claims and their equivalents be covered thereby.

We claim:

1. A computer-implemented method to reduce power consumption by a computer network, comprising:
   determining a set of minimum network elements to carry network traffic;
   identifying a logical topology for the set of minimum network elements;
   reconfiguring an optical circuit switch to implement the logical topology based on the set of minimum network elements;
   applying a constraint-based routing model to determine how to reroute traffic over the logical topology for the set of minimum network elements from a high-power-cost network element to a low-power-cost network element, the constraints including carrying network traffic and reducing power consumption;
   rerouting network traffic over the logical topology from the high-power-cost network element to the low-power-cost network element, based on the constraint-based routing model;
   responsive to the rerouting, identifying and placing a network element bearing reduced network traffic into a low-power state;
   monitoring network element utilization to determine whether more network elements are required to be activated to carry network traffic; and
   identifying and activating a low-power-cost network element to remove the low-power-cost network element from a low-power state and routing traffic to the activated low-power-cost network element.

2. The method of claim 1, wherein the computer network is a data-center network.

3. The method of claim 1, wherein the computer network is controlled by an OpenFlow controller.

4. The method of claim 1, wherein a network element may be a server, link, or switch.

5. The method of claim 4, further comprising associating each network element with a power cost.

6. The method of claim 5, further comprising calculating the power cost of each network element by summing a power consumption of the network element with a ratio of a power consumption of a next-tier network element connected to the network element to a number of links active on the next-tier network element.

7. The method of claim 1, wherein the low-power state deactivates the network element.

8. The method of claim 1, wherein the low-power state deactivates a plurality of ports of the network element.

9. The method of claim 8, wherein the low-power state deactivates a component associated with the plurality of ports.

10. The method of claim 9, wherein the component may be a line card, an application-specific integrated circuit, or a network processor.

11. The method of claim 1, further comprising activating the low-power-cost network element using a Wake-On-LAN-enabled network card controller.

12. A computer-implemented method to reduce power consumption by a computer network, comprising:
   providing a power cost associated with a network element;

determining a set of minimum network elements to carry network traffic;

identifying a logical topology for the minimum set of network elements;

reconfiguring an optical circuit switch to implement the logical topology based on the set of minimum network elements;

rerouting network traffic over the logical topology from a high-power-cost network element to a low-power-cost network element over the logical topology for the set of minimum network elements according to a linear programming model of constraint-based routing, the constraints including carrying network traffic and reducing power consumption;

responsive to the rerouting, identifying and placing a network element bearing reduced network traffic into a low-power state;

monitoring network element utilization to determine whether more network elements are required to carry network traffic; and identifying and activating a low-power-cost network element to remove the low-power-cost network element from a low-power state and routing traffic to the activated low-power cost network element.

13. The method of claim 12, wherein the computer network is a data-center network.

14. The method of claim 12, wherein the computer network is controlled by an OpenFlow controller.

15. The method of claim 12, wherein a network element may be a server, link, or switch.

16. The method of claim 15, wherein a power cost of a network element is the sum of a power consumption of the network element and a ratio of a power consumption of a next-tier network element connected to the network element to a number of links active on the next-tier network element.

17. The method of claim 12, wherein the low-power state deactivates the network element.

18. The method of claim 12, wherein the low-power state deactivates a plurality of ports of the network element.

19. The method of claim 18, wherein the low-power state deactivates a component associated with the plurality of ports.

20. The method of claim 19, wherein the component may be a line card, an application-specific integrated circuit, or a network processor.

21. The method of claim 12, further comprising activating the low-power-cost network element using a Wake-On-LAN-enabled network card controller.

22. A system to reduce power consumption by a computer network having an optical circuit switch and a software-configured packet switch, comprising:

an optical circuit switch manager for programming the optical circuit switch to implement a logical topology for the computer network;

a network element manager for monitoring a status of a network element and for programming the software-configured packet switch with a traffic routing plan;

a remote-access power switch for changing a power state of the network element;

a power manager for monitoring a power consumption of the network element and changing the power state of the network element; and a solver for identifying an alternative logical topology for a set of minimum network elements based on the status of the network element and a network performance target, for generating one or more alterations to the logical topology, and for applying a constraint-based routing model to determine how to reroute traffic over a set of minimum network elements from a high-power-cost network element to a low-power-cost network element, the constraints including carrying network traffic and reducing power consumption the traffic routing plan.

23. The system of claim 22, wherein the computer network is a data-center network.

24. The system of claim 22, wherein a network element may be a server, link, or switch.

25. The system of claim 22, wherein the network element manager is an OpenFlow controller. The method of claim 12, further comprising activating the low-power-cost network element using a Wake-On-LAN-enabled network card controller.

26. The system of claim 22, wherein the remote-access power switch is further configured for deactivating the network element.

27. The system of claim 22, wherein the remote-access power switch is further configured for deactivating a plurality of ports of the network element.

28. The system of claim 27, wherein the remote-access power switch is further configured for deactivating a component associated with the plurality of ports.

29. The method of claim 28, wherein the component may be a line card, an application-specific integrated circuit, or a network processor.

30. The system of claim 22, wherein the remote-access power switch is a Wake-On-LAN-enabled network card controller.

* * * * *